United States Patent [19]
Takata et al.

[11] Patent Number: 5,092,469
[45] Date of Patent: * Mar. 3, 1992

[54] EASILY-OPENABLE PACKAGING CONTAINER

[75] Inventors: Yukio Takata; Takeshi Shinohara, both of Sodegaura, Japan

[73] Assignee: Idemitsu Petrochemical Co., Ltd., Tokyo, Japan

[*] Notice: The portion of the term of this patent subsequent to Mar. 6, 2007 has been disclaimed.

[21] Appl. No.: 466,607

[22] Filed: Jan. 17, 1990

Related U.S. Application Data

[63] Continuation of Ser. No. 279,279, Dec. 2, 1988, Pat. No. 4,905,838, which is a continuation of Ser. No. 36,014, Apr. 8, 1987, abandoned.

[30] Foreign Application Priority Data

| Apr. 8, 1986 | [JP] | Japan | 61-79260 |
| Jul. 18, 1986 | [JP] | Japan | 61-168115 |
| Jul. 31, 1986 | [JP] | Japan | 61-178799 |
| Sep. 30, 1986 | [JP] | Japan | 61-229588 |
| Sep. 30, 1986 | [JP] | Japan | 62-229591 |
| Sep. 30, 1986 | [JP] | Japan | 61-229592 |
| Sep. 30, 1986 | [JP] | Japan | 61-229593 |

[51] Int. Cl.⁵ ............................ B65D 5/54
[52] U.S. Cl. ............... 206/245; 206/484; 220/359; 229/123.2
[58] Field of Search ............. 206/631, 489, 524.1, 206/627–630; 220/359; 229/123.1, 123.2, 123.35

[56] References Cited

U.S. PATENT DOCUMENTS

| 3,491,935 | 1/1970 | Trotter, Jr. et al. | 206/631 |
| 3,589,568 | 5/1986 | Ito et al. | 220/359 |
| 3,655,503 | 4/1972 | Stanley et al. | 206/631 X |
| 3,783,089 | 1/1974 | Hurst et al. | 206/631 X |
| 3,997,677 | 12/1976 | Hirsch et al. | 206/484 X |
| 4,308,084 | 12/1981 | Ohtusuki et al. | 206/524.1 X |
| 4,382,513 | 5/1983 | Schirmer et al. | 206/484 |
| 4,469,258 | 9/1984 | Wright et al. | 206/631 X |
| 4,905,838 | 3/1990 | Suzuki et al. | 206/631 |

Primary Examiner—Byron P. Gehman
Attorney, Agent, or Firm—Antonelli, Terry, Stout & Kraus

[57] ABSTRACT

A multilayer container having a flange portion and an easily-openable packaging container packaged by using the multilayer container, wherein the interlaminar strength of the multilayer container is smaller than the peeling strength between the flange portion and the lid member, and a ring notch is provided to an inner surface layer of the flange portion inside a heat seal portion.

The packaging container has both of a good sealing property and an easy openability and has an excellent resistance to boiling and a retort treatment, and the peeled surface has a good appearance.

A method for producing the multilayer container and a method for producing the packaging container, and an apparatus to be used for producing the multilayer container, and a method for filling and packaging, and an apparatus for filling and packaging are disclosed.

3 Claims, 13 Drawing Sheets

Fig. 19
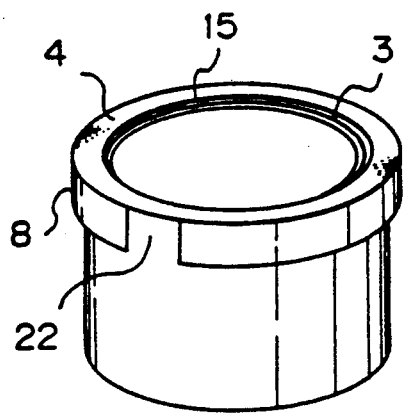
Fig. 20
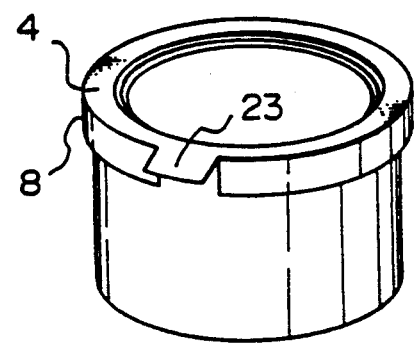
Fig. 21
Fig. 22
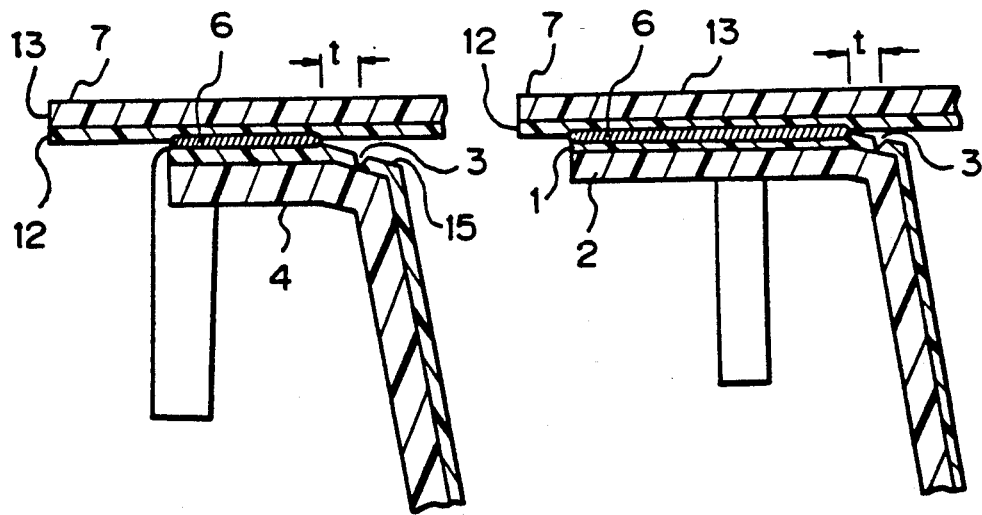

EASILY-OPENABLE PACKAGING CONTAINER

This application is a continuation of application, Ser. No. 279,279, filed Dec. 2, 1988, now U.S. Pat. No. 4,905,838 which application is a continuation of application, Ser. No. 036,014, filed Apr. 8, 1987, now abandoned.

BACKGROUND OF THE INVENTION

1. Field of the Invention

The present invention relates to a multilayer container and a method for producing the multilayer container, an easily-openable packaging container packaged by using the multilayer container, a method for packaging an article by using the multilayer container, and an apparatus for packaging an article (e.g. foods and drinks). More precisely, the present invention relates to a multilayer container suitable for heat sterilization packaging, which makes the setting of the heat sealing condition at heat sealing of a lid member easy, and is able to make a package which has not only an excellent sealing property but also a good easy openability and can be opened with a stable opening force, a method and an apparatus for easily producing the multilayer container, an easily-openable packaging container packaged by using the above-mentioned multilayer container which provides a peeled surface having a good appearance and has an excellent resistance to boiling and retort treatment, a method for packaging, and an apparatus for packaging easily.

2. Description of the Prior Art

Heretofore, flanged containers have been largely used for packaging foodstuffs or the like, and the container is sealed by heat sealing a lid member thereto after a content is filled therein. The heat seal container thus formed, however, is defective in that, if the sealing property is improved by increasing the heat seal strength, the openability at the time when the content is used is aggravated, resulting in the necessity for opening operation using an edged tool or the like, and, on the other hand, if a material having a proper interlaminer strength is selected to improve the openability, since the sealing property varies broadly depending on the heat seal conditions, such as temperature, pressure, and time, or owing to matters such as the content sandwiched between the heat seal surfaces, a uniform interlaminer strength cannot be obtained resulting in a decreased sealing property. Therefore, it cannot be used for a package in which the internal pressure is increased by heat sterilization such as boiling and retort treatment.

However, the traditional noting for the easy openability was limited to the openability in a peeling opening from the sealing area where a lid member and the flange portion of a container were heat sealed. Therefore, it has been proposed to decrease the heat seal property of the heat sealing layers. However, in this method, a good heat sealing property and an easy openability are incompatible, and the appearance of the peeled surface is deteriorated (e.g. nap or thread) resulting in a decreased commercial value. Therefore, it cannot bring a substantial solution.

Heretofore, as the apparatus for forming a notch in the flange portion of a container, there is known an apparatus for forming a score for vending-cut in one lower portion of the flange portion of a container in order to improve the openability of a lid member (c.f. Japanese Utility Model Publication No. 48102/1983). The apparatus is composed of a heat blade capable of ascent and descent for forming a notch on the underside of a flange portion and a cooling bed for supporting the said flange portion.

However, though such an apparatus can form a notch for cutting a flange along a straight line on a portion of the flange portion, accuracy of the depth or location of the notch is not always required of the apparatus according to the object of the apparatus, and, therefore, it is not satisfactory in the accuracy of the notch.

SUMMARY OF THE INVENTION

The primary object of the present invention is to provide a multilayer container, which can be advantageously used for a packaging container heat sealed with a lid member which is to be opened by taking advantage of the delamination of the multilayer container instead of by using the heat sealed area of the multilayer container and the lid member as a peeling area, can be easily opened with a stable opening force, has an excellent sealing property since it can be tightly sealed with a lid member leaving the peelability out of consideration, and further has a resistance to boiling or retort treatment, and to provide a method for producing the multilayer container.

Another object of the present invention is to provide the above-mentioned packaging container having an excellent openability and sealing property in which an article is filled in the said multilayer container and to provide a method for filling-packaging.

Another object of the present invention is to provide an apparatus for producing the above-mentioned multilayer container and an apparatus to be used for the above-mentioned method for filling-packaging.

The multilayer container of the present invention is a multilayer container having a flange portion, in which, a notch is provided at an inner peripheral portion of said flange portion of the multilayer container which can be delaminated between an inner surface layer and a layer contacting thereto, said notch being capable of cutting the inner surface layer at the inner peripheral portion of said flange portion at the time when the inner surface layer is peeled. Such a multilayer container can be produced by forming a notch by means of pressing with a notching blade, pressing with a heating blade, cutting with a cutting edge, a heating means, or a combination thereof at an inner peripheral portion of the flange portion of a multilayer container which can be delaminated between an inner surface layer and a layer contacting thereto, said notch being capable of cutting the inner surface layer at the inner peripheral portion of the flange portion at the time when the inner surface layer is peeled.

Also, such a multilayer container can be produced dimensionally accurately by a method for producing a flanged container comprising heating a multilayer sheet covered of thermoplastic resins and thermoforming, in which a notch is formed in the container forming stage with a ring notching blade.

Further, an apparatus of the present invention for forming a ring notch in the flange portion of a container comprises (a) a ring blade equipped with a heating means for forming a ring notch at the inner surface layer of the flange portion of the multilayer container and (b) a supporting member having a container receiving portion for supporting the flange portion at forming of a notch, at least one of (a) and (b) being capable of ascent and descent and being secured to the apparatus proper through an elastic member, and the apparatus can form a notch on a multilayer container dimmensionally accurately.

The easily-openable packaging container of the present invention is a packaging container comprising a multilayer container having a flange portion and a lid member heat sealed at the flange portion, in which the interlaminer strength of said multilayer container is smaller than the peeling strength between said flange portion and said lid member, and a ring notch is provided to an inner surface layer of said flange portion inside a heat seal portion, and has both of a good sealing property and an easy openability.

The method for filling and packaging an article of the present invention is an packaging method comprising filling an article in a container and heat-sealing a lid member to the flange portion of the said container, in which a container of a multilayer structure able to be delaminated is used as the said container, a notch is provided to an inner surface layer of the said container at a peripheral portion of the flange portion inside a heat seal portion before or after an article is filled, and a lid member is heat sealed. The apparatus for filling and packaging an article of the present invention comprises (a) an article filling means for filling an article in a container made of a multilayer sheet able to be delaminated, (b) a notch forming means for providing a notch to an inner surface layer of a flange portion inside a heat seal portion of the flange portion of the container and a lid member before or after the article is filled, (c) a lid heat sealing means for heat sealing a lid member to the flange portion of said container, and (d) a punching means for punching the peripheral portion of the heat seal portion. By the use of the above-mentioned method for filling and packaging and this apparatus for filling and packaging, a packaging container having both of a good sealing property and an easy openability can be obtained.

BRIEF DESCRIPTION OF THE DRAWINGS

FIG. 19 and FIG. 20 are each a perspective view of a multilayer container of an embodiment according to the present invention, and FIG. 21 and FIG. 22 are partially sectional views of easily-openable packaging containers wherein the multilayer containers shown in FIG. 19 and FIG. 20 are heat sealed with lid member.

DESCRIPTION OF THE PREFERRED EMBODIMENTS

Figure 1:
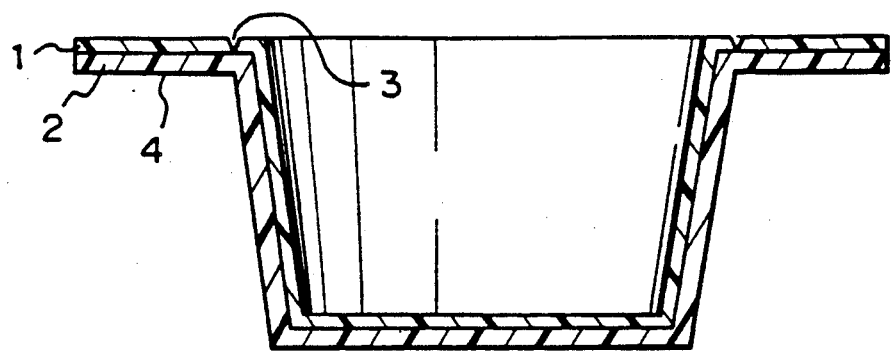
FIG. 1 is a sectional view showing a structure of a multilayer container of an embodiment according to the present invention.

FIG. 1 is a sectional view of a multilayer container of an embodiment according the present invention. A reference numeral 1 represents an inner surface layer of the multilayer container, a reference numeral 2 represents a layer contacting thereto, and a reference numeral 3 represents a notch formed at the inner peripheral portion of a flange portion. A reference numeral 4 represents a flange portion, which is to be used for heat-sealing the inner surface layer 1 of the multilayer container and a lid member after an article is filled and a lid member is covered.

The shape of the multilayer container of the present invention is not critical, and it is usually circular, square, and so forth, and the multilayer container is heat-sealed circularly along a flange portion of the shape. Also, the multilayer container may be cup-shaped or tray-shaped.

Referring to the multilayer structure of the multilayer container, it is not critical so long as the interlaminer strength of the multilayer container is smaller than the heat seal strength of a lid member and the multilayer container so that delamination occurs between the layers of the multilayer container at peeling of the lid member, and the lid member can be easily opened. The preferable interlaminer strength of the multilayer container is from 200 to 1500 g/15 mm, more preferably from 300 to 1200 g/15 mm (tensile speed: 300 mm/min). Further, the thickness of the inner surface layer at the flange portion is usually from 5 to 150 μm, preferably from 10 to 100 μm.

Such a multilayer container is not critical so long as it has a multilayer structure composed of such combination of resins or resins and other materials that a proper interlaminer strength is obtained. Illustrative of suitable resin are polyolefin base resins, polystyrene base resins, polyamide base resins, polyester base resins, polycarbonate base resins, and the like, a mixture thereof, or a mixture thereof in which from 5 to 70% by weight of various elastomers and various additives or inorganic fillers are further mixed thereto.

Illustrative of resin combination of layers are a combination of (a) a polypropylene or a polypropylene mixed with not more than 20% by weight of a polyethylene or an elastomer, and (b) a polyethylene or a polyethylene mixed with not more than 40% by weight of a polyethylene, a combination of a polystyrene and an ethylene-vinyl acetate copolymer, and a combination of an inorganic filler containing polyolefin and a polyethyleneterephthalate.

Subsequently, as a preferable example able to be used for boiling or retort treatment, a multilayer structure composed of a combination of (A) a resin mixture layer of polypropylene base resin-polyethylene base resin and (B) a high density polyethylene resin layer may be suitably used. Illustrative of the polypropylene base resin to be used for the resin mixture layer are a random copolymer of propylene and an α-olefin such as ethylene, butene-1, pentene-1, 3-methylbutene-1, and 4-methylpentene-1, and a mixture thereof, in addition to a high crystalline propylene homopolymer. Herein, the random copolymer may also be a mixture thereof with a homopolypropylene obtained by multi-stage polymerization. Within the above-mentioned copolymers, those preferred have a ratio of the copolymerizing monomer of not more than 10 mol %. Further, in these polypropylene base resins, those having a melt index (MI) ranging from 0.1 to 20, preferably from 0.2 to 15, are suitable.

On the other hand, as the polyethylene base resins to be used for the said resin mixture layer, any of a low density polyethylene (a high pressure process low density polyethlene, a linear low density polyethylene, etc.), a medium density polyethylene, and a high density polyethylene may be used. Also, in addition to an ethylene homopolymer, a crystalline, low crystalline, or amorphous random or block copolymer of ethylene with an α-olefin, such as propylene, butene-1, pentene-1, 3-methylbutene-1, and 4-methylpentene-1, or an unsaturated carboxylic acid such a vinyl acetate and acrylic acid, or a mixture thereof may be used. In the above-mentioned copolymers, those preferred have a ratio of the copolymerizing monomer of not more than 20 mol %. Further, in these polyethylene base resins, those having both of a melt index ranging from 0.02 to 50, preferably from 0.05 to 30, and a density ranging from 0.850 to 0.980 g/cm$^3$, preferably from 0.900 to 0.975 g/cm$^3$, are suitable.

The ratio between the above-mentioned polypropylene base resin and polyethylene base resin is preferably selected among a range from 50:50 to 97:3, more preferably from 60:40 to 95:5, by weight.

Further, at desire, the resin mixture may be blended with the third resin component in order to improve the compatibility or to control the adhesive property. Illustrative of the third resin component are, for example, a modified polyolefin modified with an unsaturated carboxylic acid or a derivative thereof, an ethylene-vinyl acetate copolymer, an ethylene-acrylate copolymer, an ethylene-propylene rubber, an ethylenepropylene-diene rubber, a polybutene, a polyisobutylene, a polybutadiene rubber, a polyisoprene rubber, an atactic poly-4-methylpentene-1, a styrene-butadiene rubber, an acrylonitrile-butadiene rubber, and an ion-crosslinked olefin copolymer (ionomer), and these may be used either individually or in combination of two or more of them. Preferably, these third components are used in a quantity of not more than 30 parts by weight per 100 parts by weight of the polypropylene base resin.

Illustrative of the high density polyethylene resin to be suitably used for the other layer of the multilayer container, i.e. the high density polyethylene resin layer, are, in addition to an ethylene homopolymer, copolymers of ethylene and an α-olefin such as propylene, butene-1, pentene-1, 3-methylbutene-1, and 4-methylpentene-1, and the like. In these copolymers, those preferred have a ratio of the copolymerizing monomer of not more than 10 mol %. In the high density polyethylene resins, those having a melt index ranging from 0.01 to 50, preferably from 0.02 to 20, and a density ranging from 0.940 to 0.975 g/cm are preferable, and they may be a mixture of those having different densities or molecular weights.

Though the multilayer container may be of two-layer type composed of the above-mentioned resin layers, with the object of increasing the gas barrier property or decreasing the deformation of the container, it may be a multilayer type composed of three or more layers using layers of other materials. Illustrative of the materials of other layers are, for example, a resin layer, such as an ethylene-vinyl alcohol copolymer, a polyvinylidenechloride, nylon, and a polyethyleneterephthalate, or a deposited metal layer (e.g. deposited aluminium layer), which has a good gas barrier property. The layer composed of these other materials may be either one layer or a laminate composed of two or more layer, and may also be provided with a resin layer containing from 10 to 80% by weight of an inorganic filler. In case of these multilayer structure, depending on the combination of the resins, lamination may be carried out by using an adhesive resin such as a polyolefin modified with the above-mentioned unsaturated carboxylic acid or the derivatives thereof, an ionomer, and the like.

The thicknesses of the said resin mixture layer and high density polyethylene resin layer are usually in the range from 10 to 1000 μm, preferably from 20 to 500 μm. The inner surface layer can be made thin since the outer layers will maintain the strength of the multilayer container and all the inner surface layer has to do is protect the content and be heat sealed with a lid member.

The multilayer structure of the multilayer container is to be properly selected depending on the sealant layer resin of the lid member, and, for example, when the sealant layer of the lid member is a polyethylene base sealant layer, in case of the above-mentioned combination of resin layers, a high density polyethylene layer is to be used as the inner surface layer of the multilayer container. Herein, the multilayer container of the present invention may also has another layer such as seal layer on the inner side of the inner surface layer of the multilayer container at necessity, so long as it has the feature of the present invention that the multilayer container has a peeling layer.

When a metal layer such as iron (tin plate, galvanized sheet iron) and copper is used as the outer layer of the present invention, for the inner surface layer, a resin layer having an easy peelability from the metal layer, for example, a polyolefin such as a polyethylene, a polypropylene, an ethylene-α-olefin copolymer, and an ethylene-vinyl acetate copolymer; a mixture of the said polyolefin and a modified polyolefin obtained by graft-modifying the above-mentioned polyolefin with an unsaturated carboxylic acid such as maleic anhydride or a derivative thereof; an ionomer; and a polyethyleneterephthalate, is used. By the use of this multilayer container, an easily-openable packaging container being tolerable to boiling and retort treatment and having an excellent strength, rigidity, pressure resistance, and heat stability can be produced. Further, the outer layer may be of paper, resin impregnated paper, or the like.

At the peripheral portion of the flange portion of the multilayer container, a notch 3 capable of cutting the inner surface layer at peeling of the inner surface layer on the flange is formed. Any kind of notches will be available to this notch, so long as they can cut the inner surface layer at peeling of the lid member, and therefore, the notch may as well extend into the layer contacting to the inner surface layer as extend only to midway of the inner surface layer. Further, the shape of the notch is not critical, and, for example, it may be U-shape, V-shape, cut line (half cut), etc. Also, it may be cut in from the underside of the inner surface layer. Further, the notch may be formed completely circularly at all of the inner peripheral portion of the flange portion, but a part of the inner peripheral portion may as well be leaved unnotched. In case of peeling the lid member with a part of it not peeled, the part alone is to be unnotched.

Figure 2:
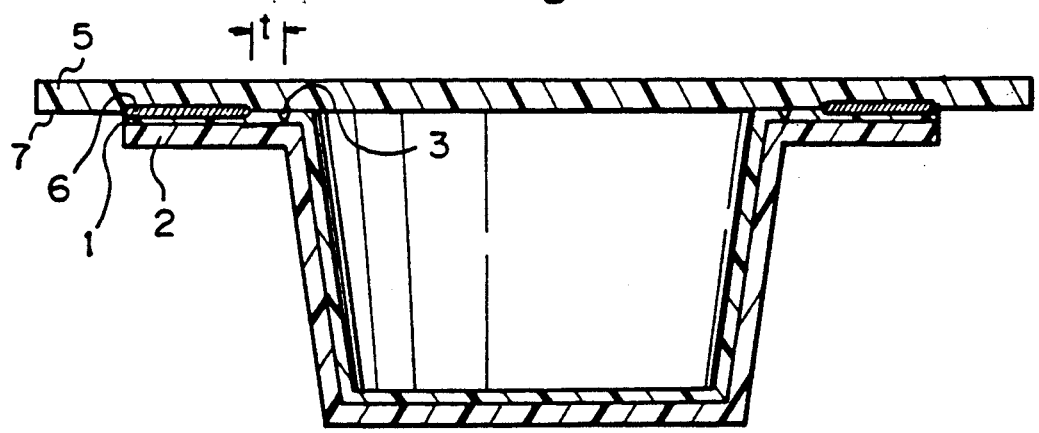
FIG. 2 is a sectional view of a container in which the multilayer container shown in FIG. 1 is heat sealed with a lid member.

Referring to FIG. 2 which is a sectional view illustrating a state where the multilayer container of the present invention is covered with a lid member 5 and heat sealed, a reference numeral 6 represents a heat seal portion, and the multilayer container and the lid member are peeling-resistively heat sealed at the flange portion of the multilayer container. The peeling strength of the seal portion sealing the inner layer of the multilayer container with the lid member is larger than the interlaminer strength of the inner layer of the multilayer container, and the preferable peeling strength is usually not less than 2.0 kg/15 mm, more preferably not less than 2.5 kg/15 mm (tensile speed: 300 mm/min). A reference numeral 7 represents a picking portion for making the pealing easy. As the sealing method, conventional methods for heat sealing plastic films such as heat seal method, impulse seal method, high-frequency bonding method, and ultrasonic wave bonding method may be used.

Although the lid member 5 is one-layer film in the multilayer container shown in FIG. 2, it would not be restricted, and it may be one-layer film or a multilayer film depending on its embodimented style. When the lid member is formed of a multilayer film, the multilayer films to be suitably used are those composed of a substrate and a sealant layer, wherein the substrate is made of a one-layer film of a plastic, a multilayer film of plastics, a paper, an aluminium foil, a complex layer thereof, or the like, and the sealant layer is composed of a resin having an easily-heat sealing property at the inner surface layer of the multilayer container such as those made of a polyethylene, a polypropylene, an ethylene-α-olefine copolymer, or an ethylene-vinyl acetate copolymer.

Figure 3:
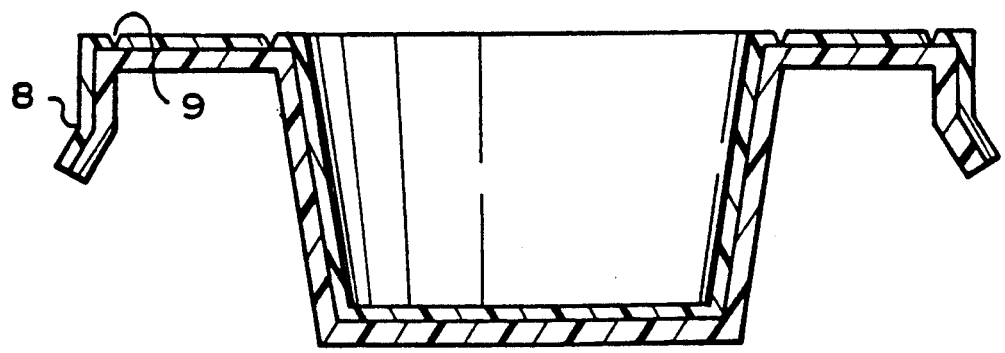
FIG. 3 is a sectional view of a multilayer container of another embodiment of the present invention.

Referring to FIG. 3 which is a sectional view showing a multilayer container of the other embodiment according to the present invention, a rib 8 is formed at the outer periphery of the flange portion. A curl also may be formed instead of the rib. In these cases, though the peeling of the lid member might be hard, a second notch formed at the outer periphery of the flange portion will make it easy.

The multilayer container of the present invention can be produced by producing a flanged multilayer container which can be delaminated between the inner surface layer and the layer contacting to the inner surface layer, and then, by the means of pressing with a notching blade, pressing with a heating blade, cutting with a cutting edge, a heating means, or a combination thereof, forming a notch capable of causing a cutting of the inner surface layer at the inner peripheral portion of the flange portion at delamination of the inner surface layer of the flange portion.

The multilayer container can be produced from the resins of the above-mentioned combination by the way of thermo-forming, such as vacuum forming and pressure forming, of a co-extrusion multilayer sheet or a laminate sheet, multilayer injection molding, multilayer injection blow molding, multilayer blow molding, or the like. Further it may also be produced by draw forming a multilayer sheet composed of a metal, such as aluminium, and a resin or thermoforming a multilayer film on the inside of a paper container.

As the laminating processing, for example, extrusion lamination, hot-melt lamination, dry lamination, wet lamination, and the like may be employed.

The preferable means for forming a notch is pressing with a heating blade or the like, and illustrative of the heating means, which is not critical, are electric-heater means, heating with a heating medium, impulse heating, high frequency heating, ultrasonic wave heating, and the like. These means are combined with a U-shaped or V-shaped ring pressing member to form a notch. When pressure and heat are employed jointly, it is preferable that the inner surface layer of the multilayer container is made of a resin having a melting point or a softening point lower than those of the outer layer and, at the same time, thickness of the inner surface layer is not more than 200 $\mu$m. Particularly, by using a heat unfusible material such as a metal for the outer layer, the notch can be certainly formed only in the inner layer.

Figure 4:
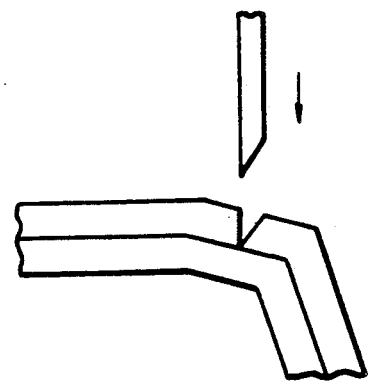
FIG. 4a, FIG. 4b, FIG. 4c, FIG. 4d, and FIG. 4e are each an explanatory views showing the method for forming a notch.
Figure 4:
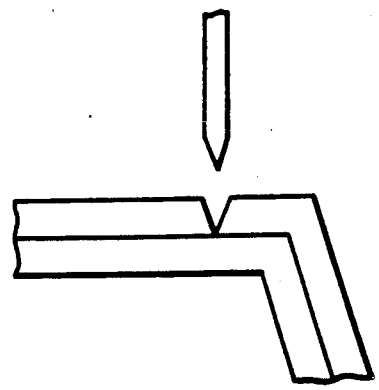
Figure 4:
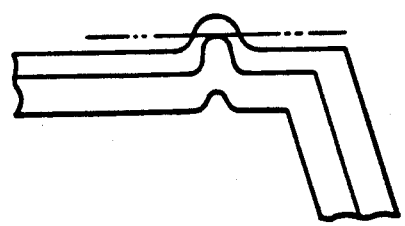
Figure 4:
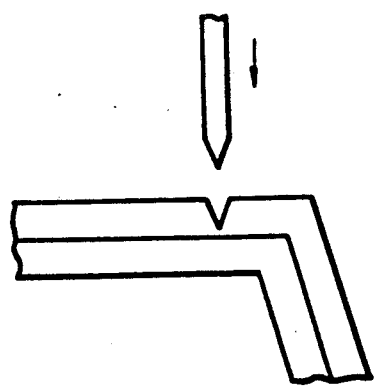
Figure 4:
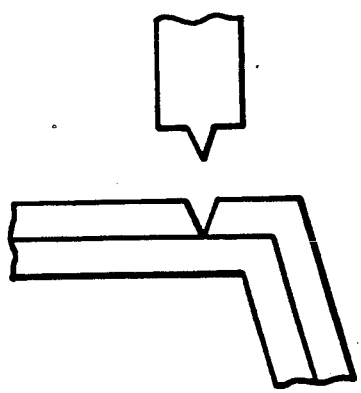

Referring to FIG. 4a, FIG. 4b, FIG. 4c, FIG. 4d, and FIG. 4e illustrating the method for forming a notch, FIG. 4a shows the state where a notch is being formed by pressing a notching blade, FIG. 4b shows the state where a notch is being formed by recessing with a cutting blade, FIG. 4c shows the state where a notch is being formed by projecting a multilayer sheet from underside and then cutting the projecting part, FIG. 4d shows the state where a notch is being formed by pressing a heating ring, and FIG. 4e shows the state where a notch is being formed by ultrasonic wave heating.

Formation of a notch by the above-mentioned methods may be carried out at thermo-forming of a container, at punching of the container, of after punching of the container.

The present invention further provides a method for producing a multilayer container capable of easily producing a multilayer container for easily-openable packaging containers which has a notch formed into a flange portion dimensionally accurately in position, depth, or the like, and, capable of incorporating a component for forming a notch to a conventional machinary.

Figure 5:
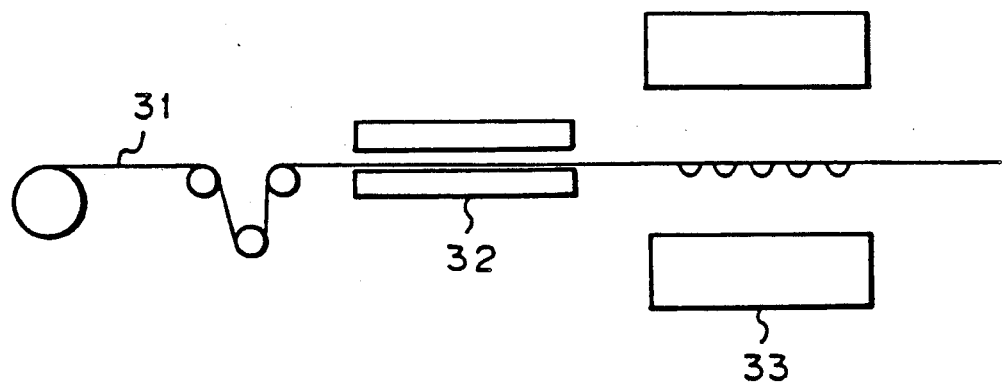
FIG. 5 is a process view showing a process for producing a multilayer container of an embodiment according to the present invention.

The method for producing the multilayer container with a notch of the present invention will be explained referring to the appended drawings. FIG. 5 illustrates an example of the process for producing a multilayer container by the method of the present invention, and FIG. 6 is a partially sectional illustration of an example of the thermo-forming section in FIG. 5.

In FIG. 5, a reference numeral 31 represents a multilayer sheet composed of thermoplastic resins, and the multilayer sheet is thermo-formed into a flanged multilayer container provided with a notch at the flange portion, by feeding it to a heating step 32 to heat to a temperature at which the sheet can be thermo-formed, then feeding it to a thermo-forming step 33.

Figure 6:
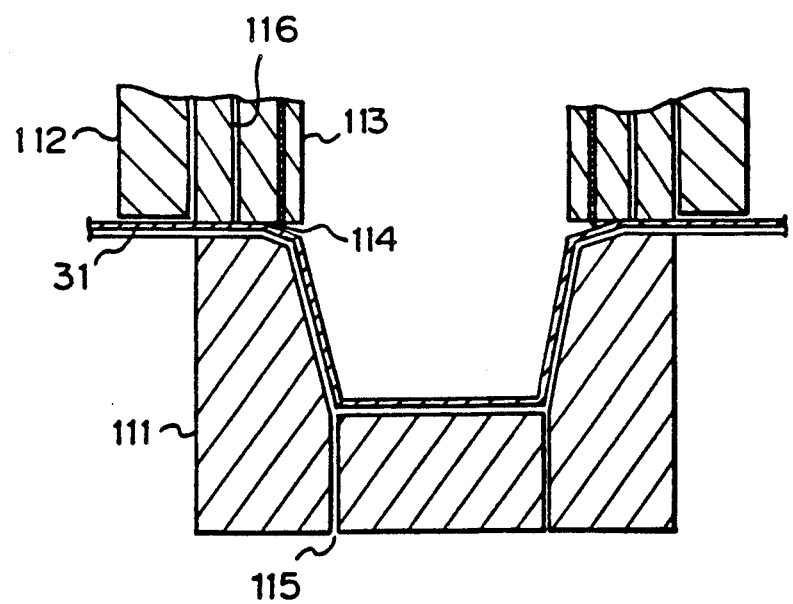
FIG. 6 is a partially sectional view of an example of a forming section of the process drawing shown in FIG. 5.

In the above-mentioned thermo-forming step, as shown in FIG. 6, the multilayer sheet 31 heated to a temperature at which it can be thermo-formed is usually thermo-formed into a container by holding the multilayer sheet with a sheet press ring 113, then fitting it to a mold 111 by a differential pressure means such as vacuum forming, pressure forming, and the like. At this time, the notching processing is conducted with a ring notching blade 114 before, after, or simultaneously with punching of the periphery of the container's flange portion with a punching blade 112. A reference numeral 115 represents a vent of the mold 111, and a reference numeral 116 represents an air pressing channel provided in the sheet press ring 113.

Also, the punching blade 112, sheet press ring 113, and ring notching blade 114 may be operated simultaneously or sequentially. Further, the time at which a notch is to be formed is not critical, so the notch may be formed before forming of the container (at the time when the sheet is holded), after heat treatment following to forming of the container (particularly effective for PET and the like), or at punching of the container. The punching of the multilayer container is not necessarily carried out in the forming process, and it may also be carried out in the next process, because the present invention is characterized in that, in case of a circular container, a notch is formed at an equivalent distance from the center. Furthermore, though the temperature of the ring notching blade 114 may be any of a room temperture, a low temperature, and a high temperature, it is properly selected according to the kind of resins, the time of forming notch, the depth of the notch to be formed, or the like.

Illustrative of the sequence of operating the punching blade 112, the sheet press ring 113, and the ring notching blade 114 are, for example, (A) ① thermo-forming, ② descent of the sheet press ring, ③ descent of the ring notching blade, ④ descent of the punching blade, (B) ① descent of the sheet press ring, ② descent of the ring notching blade, ③ thermo-forming, ④ descent of the punching blade, and (C) ① descent of the sheet press ring and the ring notching blade, ② thermoforming, ③ descent of the punching blade.

The present invention also provides an apparatus for forming a notch capable of forming a notch dimensionally accurately at the flange portion of a multilayer container.

Figure 7:
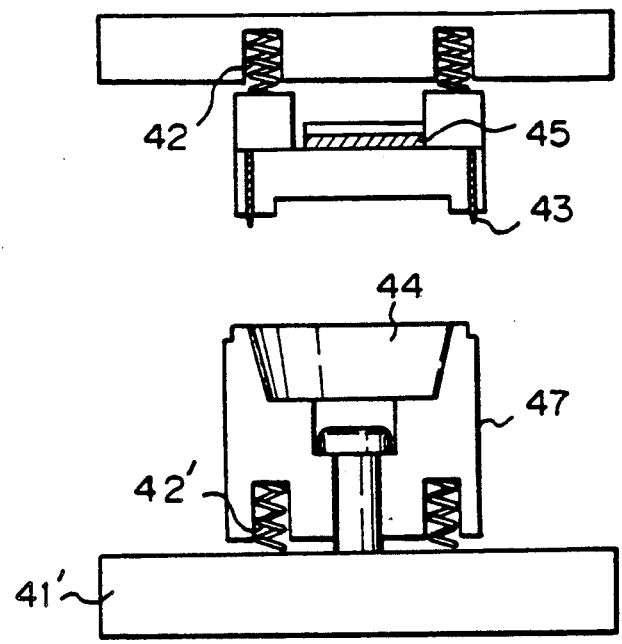
FIG. 7 and FIG. 8 are each a schematic sectional view of an apparatus for forming a notch of different embodiment according to the present invention.
Figure 8:
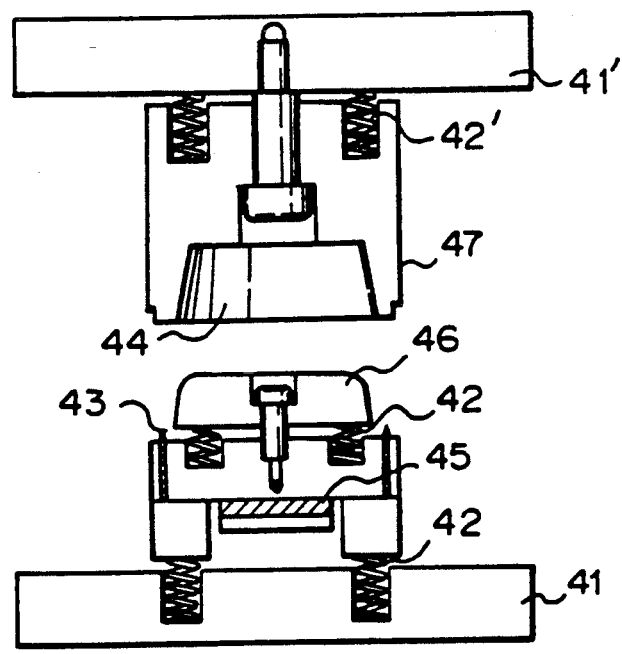

Referring to the appended drawings in order to illustrate examples of apparatuses for forming a ring notch of the present invention, FIG. 7 and FIG. 8 are sectional rough explanatory drawings of apparatuses for forming a ring notch of different embodiments of the present invention; FIG. 7 shows an apparatus wherein a ring blade is situated in the upper part and a container guide is not installed inside the ring blade, and FIG. 8 shows an apparatus wherein a ring blade is situated in the lower part and a container guide is installed inside the ring blade.

In those drawings, a ring blade 43 is a means for forming a ring notch on the upper surface of the flange portion of a multilayer container and is equipped with a heater 45 as heating means. The ring blade has a controllable blade length, and referring to the edge shape, those having the edge shapes shown in FIGS. 9(A), (B), (C), (D), (E), (F), and (G), or the like may be used.

Figure 9:
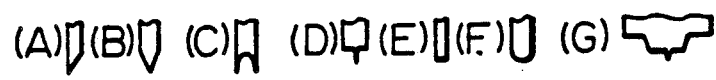
FIGS. 9(A), (B), (C), (D), (E), (F), and (G) are each an explanatory view illustrating form of blade edge of a ring blade.
Figure 10:
FIG. 10 is a sectional view showing the form of a notch formed by the blade edge shown in FIG. 9(G).

When a ring blade having an edge of the shape shown in FIG. 9(G) is used, it is preferable to use a multilayer container in which the melting point or the softening point of the resin of the notch forming layer is lower than that of the resin of the next layer. The state of a notch to be formed in this case is shown in FIG. 10.

As shown in FIG. 7, although a sufficient accuracy can be obtained in notch fomring without a container guide inside a ring blade, as shown in FIG. 8, it is preferable to install a container guide 46 inside the ring blade 43 in order to increase the forming accuracy furthermore. Though the shape of the ring blade 43 varies depending on the shape of the flange portion of the multilayer container, usually, it has a continuous ring shape such as circular shape, triangular shape, square shape, and oval shape, and as the material thereof, for example, high carbon steel (Tomson blade), chromestainless steel, aluminium, ceramics, or the like may be employed.

On the other hand, a supporting member 47 serves for supporting a flange portion at forming of a notch and has a container receiving portion 44. The supporting member 47 and the above-mentioned ring blade 43, at least one of them is capable of ascent and descent, are each secured to an apparatus proper 41 and 41' through an elastic member 42 and 42'. As the elastic member 42, 42', for example, a spring or a dashpot may be used. By the use of the elastic member, a uniformity of pressing pressure and an increase of the accuracy of the notch forming depth can be obtained. Also, when a container guide 46 is provided inside the ring blade 43, it is preferable to secure the container guide to a ring blade mounting member through the elastic member 42.

The multilayer containers to be provided with a notch at the flange portion may be individuals or multiple containers formed in one sheet.

Figure 11:
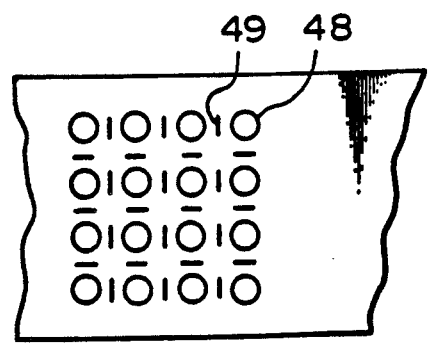
FIG. 11 is an explanatory view illustrating a state wherein a plurality of multilayer containers are formed in one sheet.

In case of forming notches to a plurality of containers in the same instance, it is advantageous to make the notching tool minutely movable by the aid of the container receiving portion or the container guide or, as shown in FIG. 11, provide a score 49 so that a plurality of containers 48 formed in one sheet can each move minutely.

In order to form a notch at the flange portion of the multilayer container by using the apparatus of the present invention, at first, the multilayer container is placed into the container receiving portion or mounted onto the container guide 46, then, in the former case, by elevating the supporting member 47 or lowering the ring blade 43, or by both of them, a notch is formed at the flange portion of the container. In the later case, a notch is formed at the flange portion of the container by elevating the ring blade 43 or lowering the supporting member 47, or by both of them. At this time, the temperature of the ring blade 43 is properly controlled depending on the kind of resin, the time of forming of a notch, the depth of the notch to be formed, and the like.

The present invention further provides an easily-openable packaging container having a high seal strength and a good easy openability, wherein a multilayer container is filled with an article and heat sealed with a lid member.

Figure 12:
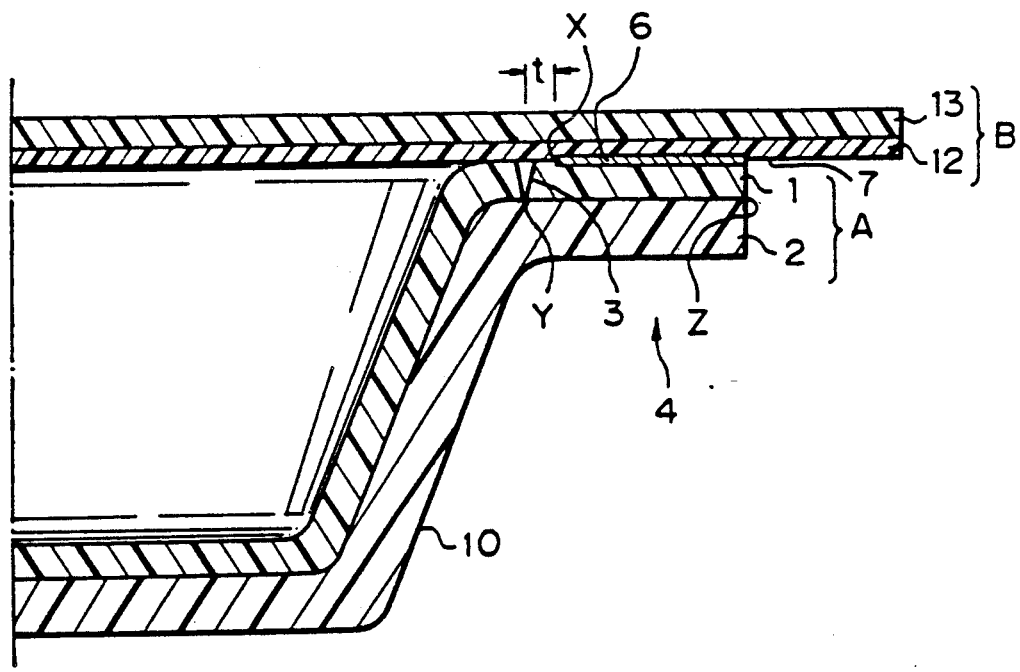
FIG. 12 is a partially sectional view of an easily-openable packaging container of an embodiment according to the present invention.

The easily-openable packaging container of the present invention will be explained according to the drawings. FIG. 12 is a partially sectional view of an easily-openable packaging container of an embodiment according to the present invention wherein the above-mentioned multilayer container and lid member are employed.

A reference letter A represents a multilayer sheet usually formed of a co-extrusion sheet or the like which is formed into a multilayer container 10 by vacuum forming or pressure forming. The multilayer container is provided with a flange portion 4 for heat sealing a lid member.

The multilayer structure A of the multilayer container is composed of an inner suface layer 1 which can be peeling-resistively heat sealed to a sealant 12 of the lid member and an outer layer 2 whose adhesive strength to the inner surface layer is smaller than that of the peeling-resistive heat seal.

The inner surface layer of the multilayer container and the lid member are heat sealed at a heat seal portion 6 in the flange portion of the container.

At the opening portion side of the inner surface layer of the multilayer container on the flange portion, a ring notch 3 is cut in.

Figure 13:
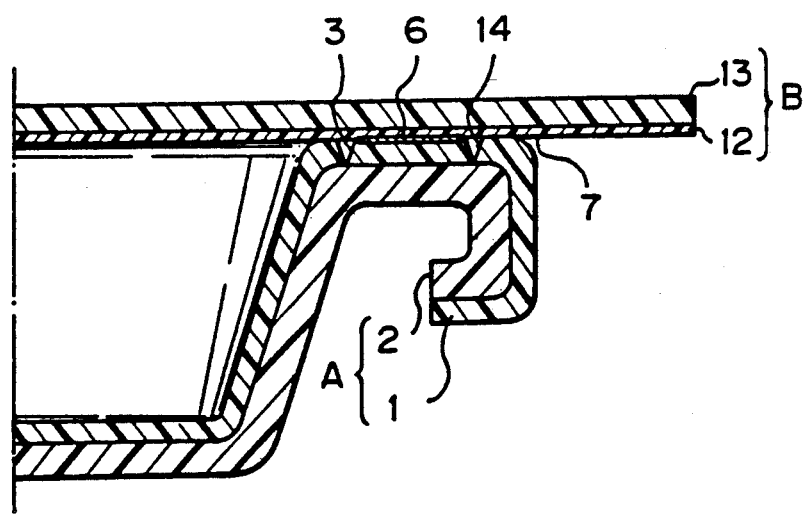
FIG. 13 is a partially sectional view of an easily-openable packaging container of another embodiment according to be present invention

FIG. 13 is a partially sectional view of an easily-openable packaging container of another embodiment according to the present invention. In this case, the periphery of the flange portion of the container is curled toward inside. In this case, a notch 14 shown in the figure formed into the inner surface layer at the peripheral side of the flange portion of the container permits the inner surface layer to be peeled easily.

The periphery of the lid member is projected to the outer side of the multilayer container to form a picking portion 7, to serve the convenience of picking at opening.

The easily-openable packaging container in which the multilayer container of the present invention is filled with an article and heat sealed with a lid member can be easily opened by the following simple motion.

For example, referring to FIG. 12, the picking portion 7 is lifted upward. Thereupon, delamination of the multilayer container occurs between the inner surface layer 1 and the layer 2 contacting thereto, and the inner surface layer is peeled to as far as a notch 3 causing the lid member to be peeled. Therefore, the opening can be easily performed even if the lid member and the multilayer container are peeling-resistively heat sealed.

Also, as against the conventional method in which the peeling occurs at a seal area, a stable opening strength can be obtained because of the absence of notch effect caused by an imperfect seal at seal end, difference in sealing condition, influence of foreign matters, and the like. Further, since peeling can be performed easily even if the peeling strength of heat seal is increased, the easily-openable packaging container will be of a so good heat-resistance as to resist to boiling and retort treatment.

Referring to FIG. 13, by lifting the picking portion, the inner surface layer and the outer layer is delaminated from a notch on the outer peripheral portion, and thereafter the lid member can be easily opened as mentioned above.

In the easily-openable packaging container of the present invention, it is preferable to leave a space between the inner end of the heat seal portion and the notch. The length of the space t is from 0.5 to 10 mm, preferably 1.5 to 5 mm. The space makes a packaging container having a peeling strength of from inside of a container larger than that of from outside, so that a packaging container being excellent in packaging of foodstuffs where a heat resistance and pressure resistance is required against boiling, retort treatment, and the like can be obtained. Though the reason is not apparent, it is supposed that, in case of peeling from inside, the stress concentrates to point X and the shearing strength of the Y-Z area becomes the peeling strength of from the point Y so that the peeling strength is increased. If the length of t is less than 0.5 mm, the peeling strength of from inside of the container isn't sufficiently larger than that of from outside, and, a length more than 10 mm is not practical.

When a space t is provided as mentioned above, an accurate control of the heat seal position on a plane flange portion becomes difficult. Thus, in case of the easily-openable packaging container, it is preferable to provide a ring notch at a non-heat seal surface more inner than the heat seal portion.

Figure 14:
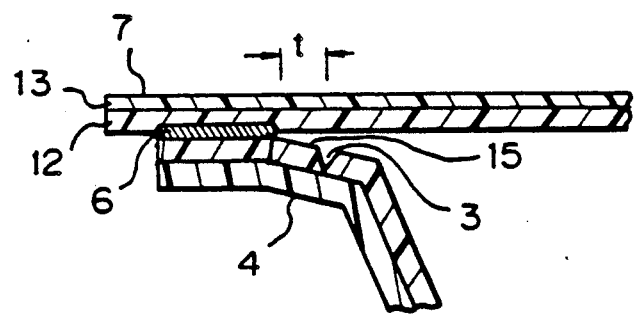
FIG. 14 through FIG. 16 are partially sectional views of easily-openable packaging containers of other embodiments according to the present invention.

FIG. 14 is a partially sectional view of an easily-openable packaging container of an embodiment according to the present invention. In this case, the flange portion 4 of the multilayer container is not completely plane, the inner peripheral portion of the flange portion inclines gradually toward the inner side of the multilayer container, and a notch 3 is provided on the inclined surface. That is to say, the notch is provided on a non-heat seal surfaee 15, i.e. the inclined surface of the flange portion. Now, representing the space from the point where the non-heat seal surface of the flange portion begins to the notch by t', heat sealing by the use of such multilayer container prevents heat sealing in the space (length t') from the outer end of the non-heat seal surface to the notch, and controles the length of t to at least the length of t' even if the heat seal portion deviates, so that a sufficient pressure resistative sealing property and an easy openability can be exhibited.

Figure 15:
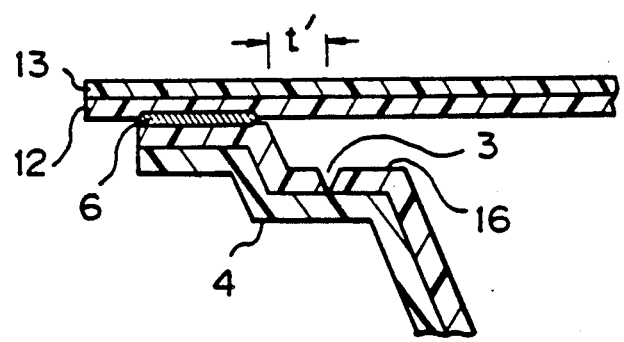

FIG. 15 is a partially sectional view of an easily-openable packaging container of another embodiment according to the present invention. In this embodiment, in order to provide a notch at a non-heat seal portion, a difference in level is provided in the inner peripheral portion of a flange portion 4, and a notch 3 is provided at a dropped surface 16 of a non-heat seal surface.

Figure 16:
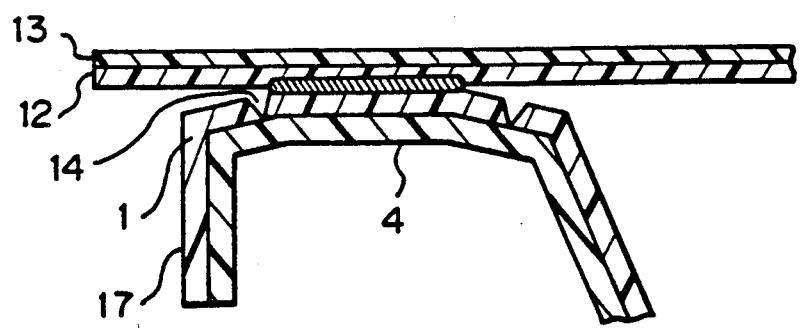

FIG. 16 is a partially sectional view of an easily-openable packaging container of an embodiment according to the present invention in which a rib 17 for enforcement is formed at the outer peripheral portion of a flange portion 4. This container is provided with a notch 14 in the inner surface layer 1 at the outer peripheral portion of the flange portion.

In addition to such a inclined surface as shown in FIG. 14 or a dropped surface as shown in FIG. 15, any non-heat seal surface will be employed, so long as it consists an area unable to contact to a lid member at heat sealing, such as, a curved surface and the like. Since a notch is provided at a non-heat seal surface, by using a relatively wide heat seal ring at the time when a lid member and a multilayer container is heat sealed, all of the flat surface portion of the flange portion can be sealed even if the seal shifts, so that both of a uniform length of t and a uniform position of the outer end of the heat seal portion can be obtained. Therefore, the heat seal operation can be easily conducted, and a stable opening strength can be obtained.

Further, in the easily-openable packaging container of the present invention, it is preferable to make a heat unfusible layer on at least one of flange portion inside the heat seal portion and the lid member, and to provide a ring notch inside the heat seal portion.

Figure 17A:
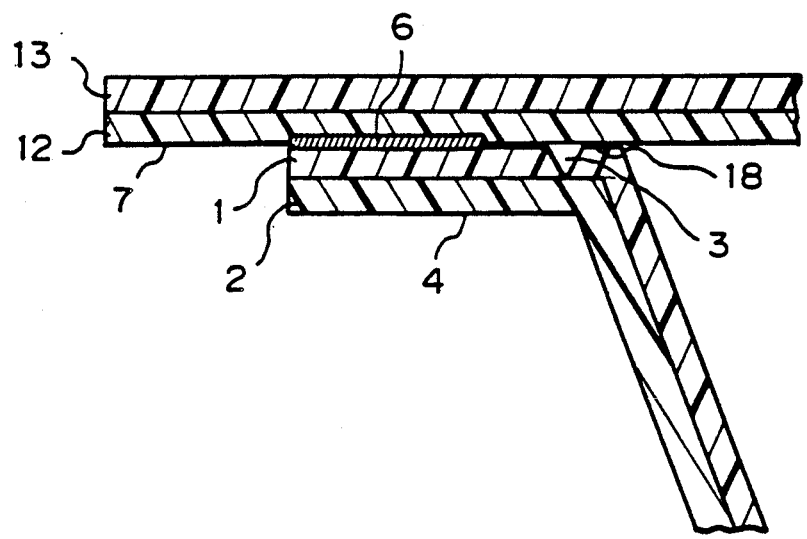
FIG. 17a is a partially sectional view of an easily-openable packaging container of an embodiment according to the present invention and FIG. 17b is a partially sectional view illustrating a state wherein the lid member of the easily-openable packaging container shown in FIG. 17a is being peeled.

FIG. 17a is a partially sectional view of an easily-openable packaging container of another embodiment according to the present invention. In this case, a heat unfusible layer 18 is formed inside a heat seal portion 6 of a flange portion 4 of a multilayer container, and this portion will not be sealed when a lid member is heat sealed to the flange portion with a heat seal ring. Therefore, a fixed space can be provided between the inner end of the flange portion and the notch. Though the heat unfusible layer is provided at flange portion in FIG. 17a, the heat unfusible layer may also be provided on a lid member. The material of the heat unfusible layer is not critical so long as it can prevent the heat fusion of a flange portion and a lid member at the time when the flange portion and the lid member is heat sealed. A notch 3 is provided at the heat unfusible portion of the inner surface layer in the flange portion previously. Heat sealing by using such a container makes it possible to control the length of t to be fixed, and thus a sufficient sealing property and an excellent easy openability can be exhibited.

Figure 17B:
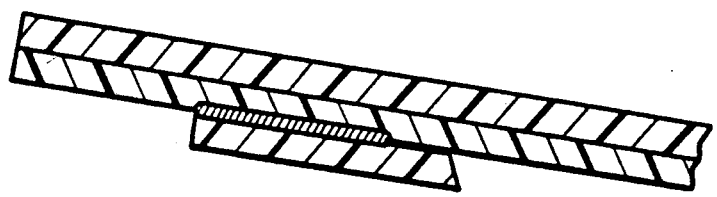
Figure 17B:
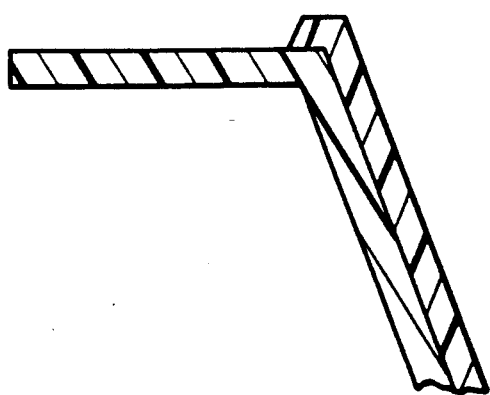

FIG. 17b is a partially sectional view illustrating a state where the lid member shown in FIG. 17a is being peeled. Following to the occurence of a delamination of a multilayer container the inner surface layer is cut at the notch resulting in the peeling at the lid member.

Figure 18:
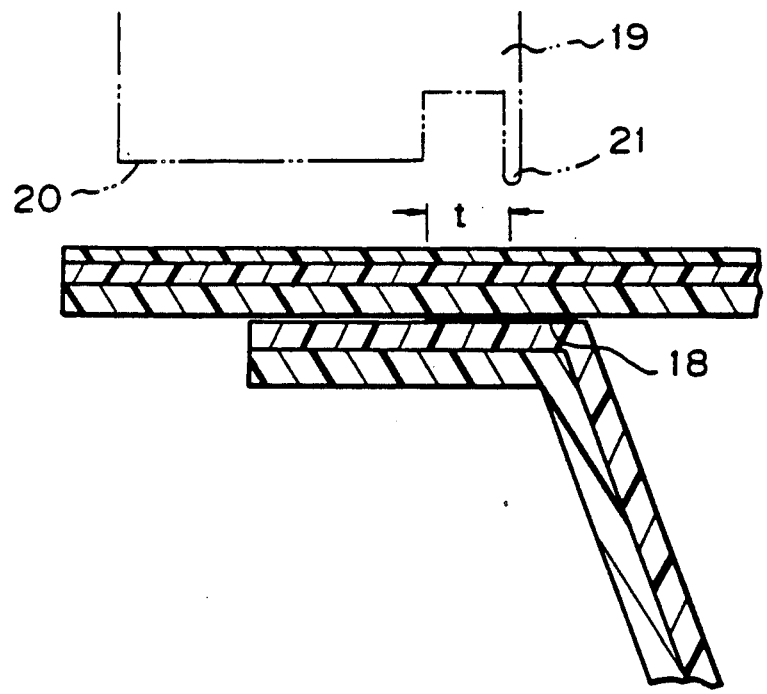
FIG. 18a and FIG. 18b are explanatory sectional views illustrating an example of operation for forming a notch on a multilayer container.
Figure 18:
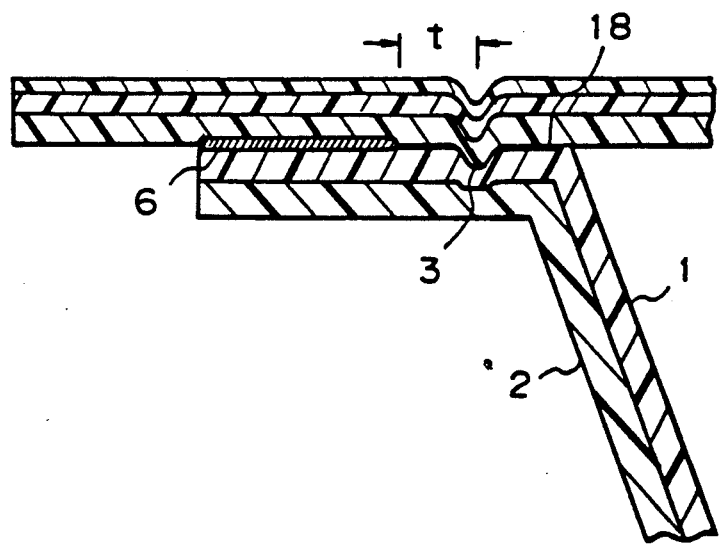

FIG. 18a and FIG. 18b are sectionally explanatory drawings illustrating a method for conducting both of heat sealing of the easily-openable container of the present invention and forming of a notch simultaneously. A heat seal ring 19 is provided with a sealing member 20 for heat sealing and, at a distance t from the seal portion, a ring member 21 in one body. By conducting heat sealing and forming of a notch simultaneously like this, a fixed t and a good operation efficiency can be obtained and, further, heat sealing and forming of notch can be performed without damaging the shape of the container. In this example, however, it is required that the condition of the length of the ring member or the like is so predetermined as to cause no damage of the lid member at forming of a notch. Further, in order to keep the shape of the multilayer container from damage, it is preferable to employ an unfusible material, such as a resin having a melting point higher than that of the material of the inner surface layer 1, a metal, or the like, as the material of the layer 2 contacting to the inner surface layer. Such a heat unfusible layer provided thereto permits a notch to be formed at the same time or after heat sealing, and, therefore, the conventional packaging process may be employed.

Further, when a rib or a curl is provided to the easily-openable packaging container of the present invention in order to improve the strength of the flange portion of the multilayer container, the handling feeling, and the design quality, it is preferable to provide a cut-off portion in the vicinity of the flange portion of the rib portion or the curl portion.

FIG. 19 is a perspective view of an easily-openable packaging container of an embodiment according to the present invention in which a cut-off portion 22 is provided at a rib portion 8. In this case, a cut-off portion 22 extending from the underside to the flange level is provided in the rib portion which is provided to the end of the flange portion of a multilayer container. The inner end portion of the flange portion 4 is formed into a non-heat seal surface 15 of a gradually inclined plane, and a notch 3 is provided to the non-heat seal surface 15.

In the easily-openable packaging container of the present invention, the cut-off portion, which is provided to the rib portion or curl portion near the flange level, exposes a cross section of the inner surface layer of the multilayer container and the layer contacting thereto near the flange level, and gives occasion for peeling of the inner surface layer of the multilayer container at opening. Though, in FIG. 19, the cut-off portion extends from the lowest portion of the rib portion to flange level, the size and shape is not critical so long as it can achieve the above-mentioned purpose. Therefore, the cut-off portion may be a score, a hole, or the like provided in the rib or curl portion near flange level. However, it is necessary to locate it near flange level, and, if it is located too far from the flange level, the occasion for peeling of the inner surface layer of the multilayer container can not be obtained.

Further, in the present invention, since the peeling of the inner surface layer starts from the cut-off portion, it is enough to provide a notch only to the inner end portion of the flange portion. That is, a notch in the outer peripheral portion of the flange portion is not always required since the edge effect caused by heat seal enables cutting.

FIG. 20 is a perspective view of a multilayer container to be used for an easily-openable packaging container of another embodiment according to the present invention. In this case, a cut-off portion of a rib portion 8 is not cut at a position where it contacts to a flange portion 4, but arises to the flange level to form a flat surface 23. Also, in this case, either side of the flat surface 23 may be connected to the rib 8.

FIG. 21 is a partially sectional view of a cut-off portion of an easily-openable packaging container of the present invention in which the multilayer container shown in FIG. 19 is heat sealed with a lid member. A notch 3 is provided to a non-heat seal surface 15 of a flange portion 4. A heat seal portion 6 extends to the outer periphery of the flange portion 4. A lid member (12,13) is provided with a picking portion 7 for making opening easy. FIG. 22 is a partially sectional view of a part including a cut-off portion of an easily-openable packaging container of the present invention in which a lid member is heat sealed to the multilayer container shown in FIG. 20. In both of FIG. 21 and FIG. 22, a cross section of the inner surface layer 1 of the multilayer container and the layer contacting thereto is exposed by the cut-off portion, near the flange level of the multilayer container. Thus, when the picking portion 7 is holded up to open, delamination begins between the inner surface layer 1 and the layer 2 contacting thereto exposed by cutting off, then the inner surface layer in the outer periphery of the heat seal portion is cut along the outer end of the heat seal portion subsequently, and the inner surface layer is further peeled causing the progress of opening. Also, in the easily-openable packaging container of the present invention, in order to further increase the openability, instead of providing a picking portion to a lid member as mentioned above, a tongue peace may be substituted for the picking portion by placing it on the flange portion over the cut-off portion and heat sealing a lid member. Further, instead of inserting a tongue piece, a picking portion may be provided only at a part of the lid member over the cut-off portion to serve as a tongue piece portion having a tongue shape.

When this packaging container having a rib portion or a curl portion is opened, for example, in FIG. 22, the picking portion 7 is raised upward for a start. Thereupon, delamination begins between the inner surface layer 1 and the layer 2 contacting thereto exposed by cutting off, then the inner surface layer in the outer periphery of the heat seal portion is cut, thereafter, delamination progresses between the inner surface layer 1 and the layer 2 contacting thereto, and the inner surface layer is peeled to the notch 3, resulting in the peeling of the lid member. Thus, opening can be easily achieved even if the lid member and the multilayer container is heat sealed peeling resistively. Further, when another notch is further provided also to the outside of the heat seal portion of the flange portion, cutting and peeling of the inner surface layer becomes more easy, and the openability increases.

Figure 23:
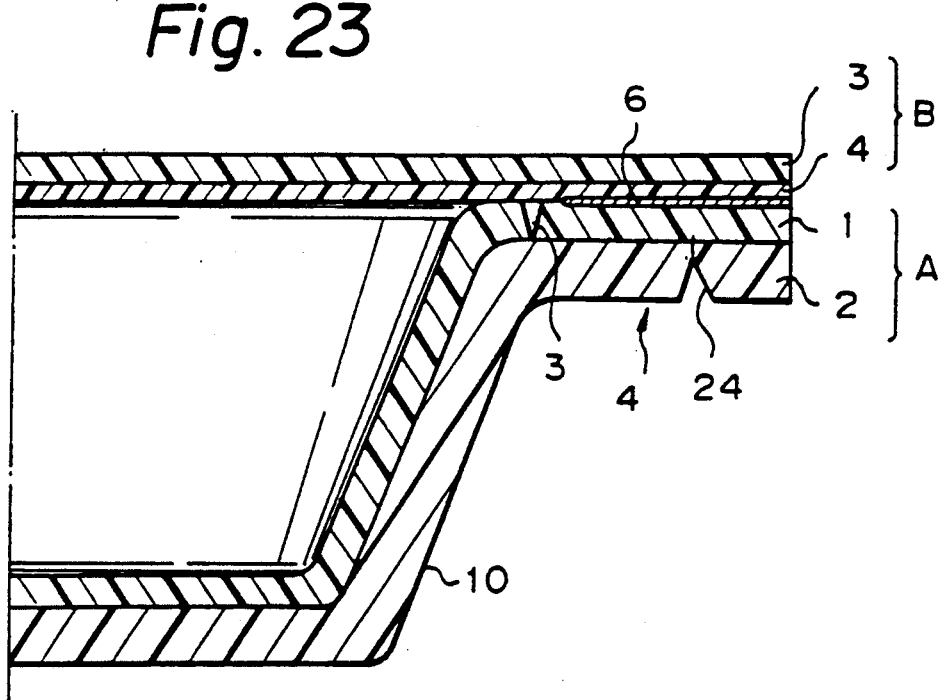
FIG. 23 is a partially sectional view of an easily-openable packaging container of an embodiment according to the present invention.
Figure 24:
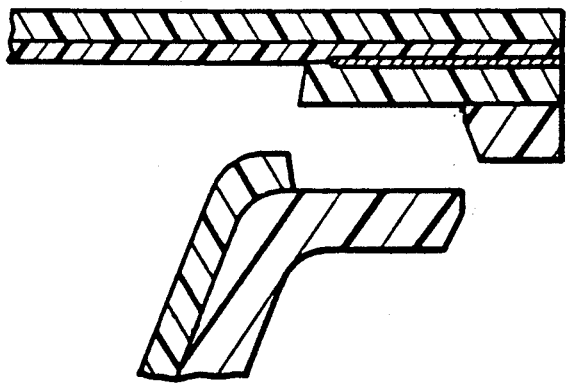
FIG. 24 is a partially sectional view illustrating a state wherein the easily-openable packaging container shown in FIG. 23 is being opened.

Also, when, as shown in FIG. 23, the easily-openable packaging container of the present invention is provided with notches not only to the inner surface layer at the container's opening portion side of the flange portion but also to the outer layer at the peripheral portion of the container, the outer layer separates into two at the notch 24 as shown in FIG. 24, then delamination occurs between the inner surface layer 1 and outer layer 2 of the container, thus it can be opened easily.

Figure 25:
FIG. 25 is a sectional view of an example of a lid member to be used in the present invention.

As mentioned above, in comparison with the conventional methods in which opening is performed by peeling a lid member and a multilayer container from a sealing area, since the easily-openable packaging container of the present invention is opened by delaminating the multilayer container, it can be opened easily even if the lid member and the multilayer container is peeling resistively heat sealed. Because of the above-mentioned posibility of strong sealing, the range for sellecting the material and shape of the lid member is so wide that, for example, a drop lid as shown in FIG. 25 also may be used. Packaging using a drop lid has such advantage that the residual air in the container can be reduced causing an increase of the keeping quality of foodstuffs. However, opening of containers made by conventional packaging methods has been difficult, because, when a content such as soup is filled in the container, the content overflowed by setting of a drop lid causes so bad effects to the seal portion at heat sealing that a strong sealing is required. However, since the packaging containers of the present invention can be sealed strongly, a drop lid can be suitably used for them. The shape of the drop lid is not critical so long as it can be engaged with the opening portion of the multilayer container to expel air, and it may have a curved shape, a shape having a flat bottom face, or the like.

In the method for filling and packaging an article of the present invention, a notch is provided to an inner surface layer of a flange portion before or after filling of an article. The notch may be formed by, for example, a physical method using a notching blade or a cutting blade, a heating method by heat-ray fusing cutting (impulse) or a heat blade, a mechanical vibration method using ultrasonic wave, an internally exothermic method using high frequency, or the like. When such a notch is provided before filling of an article, an article is subsequently filled in the said container, then a lid member is heat sealed to the flange portion. For example, a notch can be easily formed by pressing a ring notching blade having a V-shaped edge (heated at need). In this case, a notch forming ring may be installed to a conventional non-heating hitting ring for preheating a lid member by non-heating hitting before sealing. In case of a container with a tongue piece for peeling, it is preferable to heat seal the end portion of the tongue piece securely to lid member. Also, it is desirable to form a penetrating notch in the sheet. When a notch is formed after filling of an article, a lid member is subsequently heat sealed to the flange portion.

After a lid member is heat sealed in this manner, the periphery of the heat seal portion is punched to obtain a package having a peelable opening part. In this case, two or three containers may be punched in one body.

In the above-mentioned method for filling and packaging of the present invention, "forming of a container" means not only forming in a through line but also a multilayer container formed previously.

Figure 26:
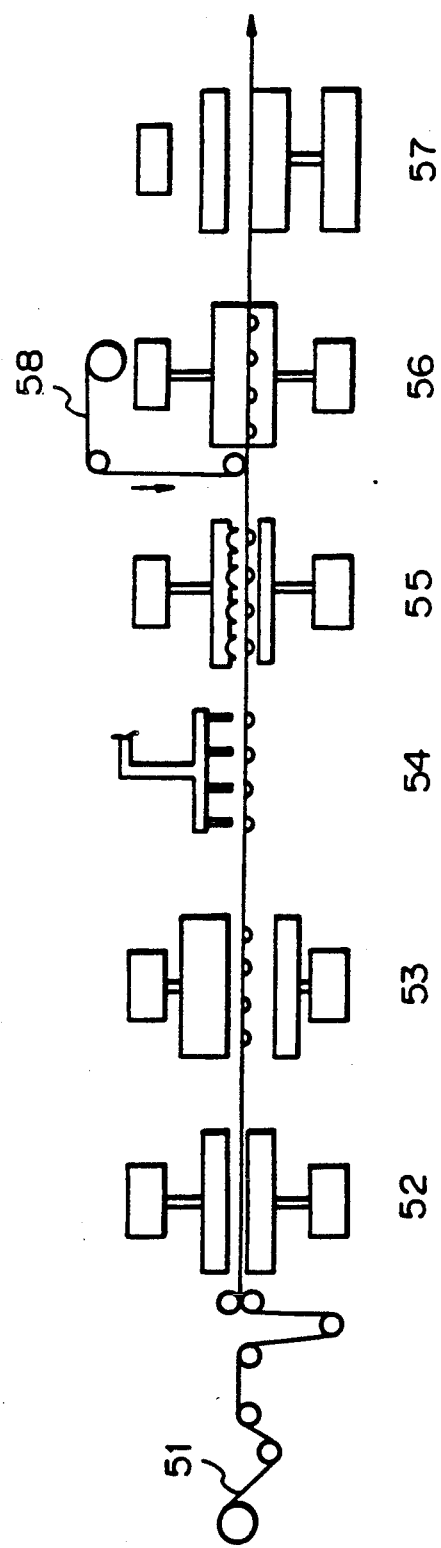
FIG. 26 is an explanatory view illustrating an apparatus for filling and packaging an article of an embodiment according to the present invention.

The apparatus for filling and packaging an article of the present invention is an apparatus for a through line method within the above-mentioned method for filling and packaging. Referring to FIG. 26 which is an explanatory drawing showing an example of the said apparatus incorporating a container forming means, a multilayer sheet 51 is heated by a heating means 52, then fed to a container forming means 53. In the container forming means, the multilayer sheet 51 is formed into a container by, for example, vacuum forming or pressure forming.

Then, the container thus formed is fed to an article filling means 54 to be filled with an article, thereafter, in a notch forming means 55, a notch is provided to an inner surface layer of a flange portion inside a heat seal portion of the flange portion and a lid member. In the apparatus of the present invention, the above-mentioned article filling means and the notch forming means may be inverted, and the notch forming means may include a non-heating hitting means. Subsequently, a lid member is heat sealed to the flange portion of the container in a lid member heat sealing means 56, then the periphery of the heat sealed portion is punched to obtain a package having a peelable opening part. A reference numeral 58 represents a lid member film.

According to the method and apparatus of the present invention, an easily-openable packaging container can be produced by using a multilayer sheet as a starting material without addition of special processes, and, in a certain case, by a through process comprising from forming of a container to punching. Therefore, the content is never polluted, and the packaging cost is low.

EXAMPLES

The present invention will be described in more details referring to the following examples, but the present invention is not to be limited to these examples.

EXAMPLE 1

A multilayer sheet [I] mentioned below was formed by co-extrusion process.

Inner layer: a high density polyethylene 70 μm [IDEMITSU POLYETHYLENE 440M produced by Idemitsu Petrochemical Co., Ltd., density: 0.96 g/cm³, MI: 0.9 g/10 min., molecular weight distribution: narrow]

Outer layer: a polypropylene base resin layer 200 μm: a mixture of 80% by weight of a polypropylene [IDEMITSU POLYPRO E-100G produced by Idemitsu Petrochemical Co., Ltd., MI: 0.6 g/10 min.], 15% by weight of a low density polyethylene [PETOROSEN 172 produced by Toyo Soda Mfg. Co., Ltd., density: 0.92 g/cm³, MI: 0.3 g/10 min.], and 5% by weight of a high density polyethylene [IDEMITSU POLYETHYLENE 530B produced by Idemitsu Petrochemical Co., Ltd.]

By using the multilayer sheet [I], a flanged multilayer container of 60 mm φ×40 mm (height) was formed by pressure thermo-forming. A notch was formed at the inner peripheral portion of the flange portion of this multilayer container by the following three methods.

(1) A notch was formed by pressing a ring notch blade of 0.8 mm in thickness having a sharp edge.

(2) A notch was formed by pressing a seal ring of 1 mm in width at from 170° to 190° C. and 2 kg f/cm² for one second.

(3) A notch is formed by contacting a ring notching blade to a part to be provided with a notch, and treating with ultrasonic wave from the opposite surface (900 W, radiating time: 0.05-0.09 sec.).

The inner layers of multilayer containers produced by these methods were peeled, and then all of the inner layers were cut at the notch portion.

When a lid member (1) made of an oriented nylon/polyvinylidenechloride/linear polyethylene (15μ/20μ/40μ) was heat sealed to the multilayer container at the flange portion and the lid member was peeled, delamination of the multilayer sheet of the multilayer container occurred, then the inner layer of the multilayer container was cut at the notch portion, and opening was performed easily.

EXAMPLE 2

A multilayer sheet [II] (0.8 mm in thickness) consisting of six layers of four kinds was formed by coextrusion forming.

a:b:c:d:c:b = 50:350:20:30:20:350(μm)

a: a high density polyethylene [IDEMITSU POLYETHYLENE 440M produced by Idemitsu Petrochemical Co., Ltd., density: 0.96 g/cm³, MI: 0.9 g/10 min., molecular weight distribution: narrow]

b: a mixture of 80% by weight of a polypropylene [IDEMITSU POLYPRO E-100G produced by Idemitsu Petrochemical Co., Ltd., MI: 0.6 g/10 min.] and 20% by weight of a low density polyethylene [PETOROSEN 172 produced by Toyo Soda Mfg. Co., Ltd., density: 0.92 g/cm³, MI: 0.3 g/10 min.]

c: a polypropylene modified with maleic anhydride [IDEMITSU POLYTAC E100 produced by Idemitsu Petrochemical Co., Ltd.]

d: a saponificated ethylene-vinyl acetate copolymer [EVAL EP-F101 produced by Kuraray Co., Ltd., ethylene content: 32 mol %, MI: 1.3 g/10 min.]

Figure 27:
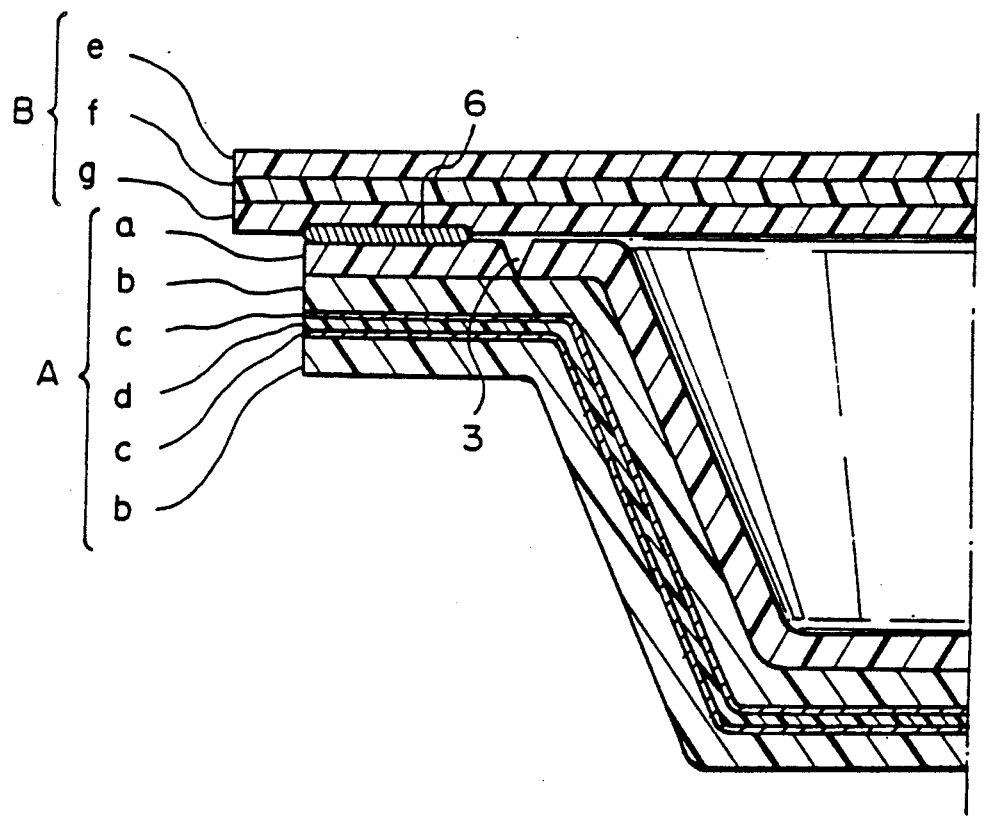
FIG. 27 is a partially sectional view of an example of an easily-openable packaging container of the present invention.

A flanged container of 60 mm φ×40 mm (height) was produced by heating the multilayer sheet [II] to formable temperature, inserting it on a mold as shown in FIG. 6, lowering a sheet press ring, forming by pressure thermo-forming, lowering a ring notching blade, elevating a ring notching blade, and lowering a punching blade. A ring notch of 60 μm in depth was formed in the flange portion as shown in FIG. 27.

Thereafter, a lid member (1) [e:f:g] used in Example 1 was heat sealed to the flange portion under conditions of temperature of 170° C., pressure of 4 kg, 1.5 seconds, and double pressing sealing, using the linear low density polyethylene layer as sealing layer.

Peeling test for the flange portion of the sealed container was conducted in accordance with JIS K 6854. Further, after the container was filled with water and applied to a retort treatment of 120° C., 30 minutes, peeling test was conducted again. The results are shown in Table. Herein, there was no breakage after the retort treatment, and the container had an excellent gass barrier property.

EXAMPLE 3

A container was produced by the same procedure in Example 2 providing the high density polyethylene was altered to IDEMITSU POLYETHLENE 530B [Idemitsu Petrochemical Co., Ltd., MI: 0.3g/10 min., density: 0. 957 g/cm³, molecular weight distribution: broad]. The results are shown in Table.

TABLE

| | | Peeling strength | |
|---|---|---|---|
| | | Example 2 (g/15 mm) | Example 3 (g/15 mm) |
| opening side | before retort treatment | 950 | 700 |
| | after retort treatment | 700 | 550 |
| non-opening side | before retort treatment | 3,500 | 2,900 |
| | after retort treatment | 3,100 | 2,500 |

EXAMPLE 4

A multilayer container having a flange portion of 50 mm φ in opening portion, 40 mm φ in bottom face, 20 mm in height, and about 200 μ in thickness was formed from an aluminium sheet coated with a polypropylene modified with maleic anhydride (0.6 mm in thickness, resin layer 150 μ) by stretch forming. At the inner resin layer of the multilayer container in the inner portion of the flange portion, a ring notch extending to the metal layer was formed with a heat blade along the inner periphery of the flange portion. Then, to this container, a lid member which had an aluminium foil layer of 20 μ in thickness and a sealing layer of 50 μ in thickness formed from a polyethylene containing ethylenevinyl acetate copolymer modified with maleic anhydride was heat sealed. The space t between the inner end of the heat seal portion and the notch was adjusted to 1 mm.

When the sealed lid member was peeled, delamination occurred between the metal layer and the easilypeelable resin layer, and opening was performed easily with a uniform peeling force.

EXAMPLE 5

A multilayer container of 60 mm in diameter of opening portion, 50 mm in diameter of bottom face, and 25 mm in height was produced from a multilayer sheet by pressure thermo-forming. The inner layer of the flange portion was a high density polyethylene (50 μ), and the outer layer was a polypropylene blended with 10% by weight of an ethylene-propylene rubber (500 μ).

At the flange portion of the container, a ring notch extending nearly to the outer layer was formed.

Then, a lid member of a multilayer film (PET-/EVOH/LLDPE: 12 μ/20 μ/30 μ) was heat sealed by using LLDPE as the sealing layer, to obtain an easily-openable packaging container. When the container was peeled from a picking portion, delamination of the multilayer container occurred, and peeling feeled good.

EXAMPLE 6

Figure 28:
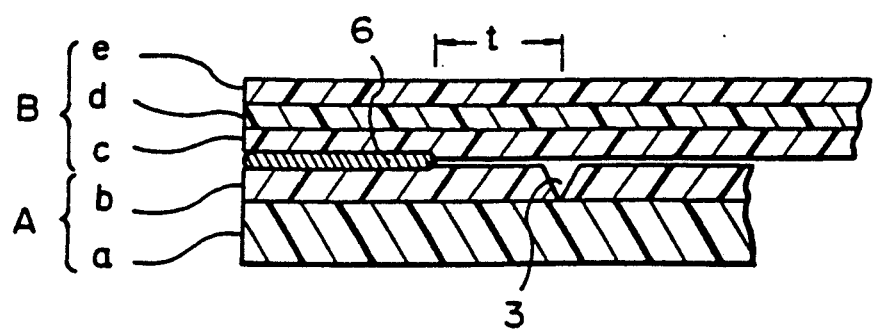
FIG. 28 is a sectional view of a test piece for measuring the peeling strength of a packaging container.

A multilayer sheet and a lid member having the layer structure shown in FIG. 28 were produced.

On an co-extruded multilayer sheet [III] consisting of
- a: a mixture of 80 parts by weight of a polypropylene [IDEMITSU POLYPRO E-100G produced by Idemitsu Petrochemical Co., Ltd., density: 0.91 g/cm$^3$, MI: 0.6 g/10 min.] and 20 parts by weight of a low density polyethylene [PETOROSEN 172 produced by Toyo Soda Mfg. Co., Ltd., density: 0.92 g/cm$^3$, MI: 0.3 g/10 min.]
- b: a high density polyethylene [IDEMITSU POLYETHYLENE 440M, density: 0.96 g/cm$^3$, MI: 0.9 g/10 min.] (layer a: 200 μm in thickness, layer b: 50 μm in thickness), a notch of 70 μm in depth was formed.

To this sheet, the lid member (1) [e:d:c] used in Example 1 was heat sealed under the conditions of temperature of 170° C., pressure of 1.5 kg/cm$^2$, and 1.5 seconds, using the linear low density polyethylene layer as the sealing layer, altering the space t. 180° peeling strength of the seal portion was measured in accordance with JIS K 6854. The result was such that delamination occurred between a and b, and the peeling strength was as follows;

| | |
|---|---|
| t = 0 mm | 0.54 kg/15 mm |
| 1 mm | 2.2 kg/15 mm |
| 3 mm | 3.5 kg/15 mm |
| 5 mm | >4 kg/15 mm |

Next, containers each having t of 2 mm and 4 mm, above-mentioned layer structure, and shape shown in FIG. 12 were produced. Then, after water was filled, these containers were heat sealed and retort treated at 120° C. for 30 minutes. These containers were not opened at all.

Each container had an opening strength of about 0.9 kg/15 mm before retort treatment, and about 0.6 kg/15 mm after retort treatment, and was easily opened. The peeled surfaces were smooth.

Further, an internal pressure was applied with a pump to a sealed container having t of 2 mm produced by heat sealing a lid member to a container filled with water, and the internal pressure at which the lid member was peeled was measured. (average value of five containers)

before retort treatment 1.45 kg/cm$^2$
after retort treatment 1.30 kg/cm$^2$
(conditions of retort treatment: 120° C., 30 minutes)

When the internal pressure is applied, after the lid member expanded to a hemispherical shape from the inner end of the sealing area (point X), delamination of the multilayer container occurred.

EXAMPLE 7

A multilayer container having a flange portion of 60 mm φ×40 mm (height) was formed from the multilayer sheet [I] of Example 1 by vaccuum and pressure thermo-forming.

In the flange portion of the multilayer container (8 mm in width), the inner portion (3 mm in width) was formed into a non-heat seal surface of a gradually inclined plane. A ring notch was formed at 2 mm distance from the outer end of the non-heat seal surface by pressing a ring having a V-shaped edge heated to 160° C.

When the inner surface layer of the flange portion of the multilayer container having a notch obtained by the above-mentioned method was peeled, the inner surface layer was cut at the notch portion.

When the lid member (1) used in Example 1 was heat sealed to the multilayer container at the flange portion, the non-heat seal surface was not heat sealed. Further, when the lid member was peeled, delamination of the multilayer container occurred, then the inner surface layer of the multilayer container was cut at the notch, so that opening was easily conducted. The opening force was stable.

EXAMPLE 8

A flanged multilayer container of 60 mm φ×40 mm (height) was formed from the multilayer sheet [I] used in Example 1 by vaccuum and pressure thermo-forming. A heat unfusible layer of a silicone resin as shown in FIG. 17a was provided to the inner portion of the flange portion of the multilayer container. The multilayer container was covered with the lid member (1) used in Example 1, then, by the use of a heat seal ring (t=3 mm, width of the extruding ring: 1 mm), heat sealing and forming of a notch were conducted simultaneously, at a temperature of 170° to 190° C., and pressure of 2 kg f/cm$^2$, for one second, as shown in FIG. 18b.

When the container thus formed was peeled the lid member, delamination of the multilayer sheet of the multilayer container occurred, then the inner surface layer of the multilayer container was cut at the notch so that the container was opened easily. Also, the opening force was stable.

EXAMPLE 9

A flanged multilayer container of 60 mm φ×40 mm (height) having a rib portion of 6 mm in length was formed from the multilayer sheet [I] used in Example 1 by vaccuum and pressure thermo-forming. At the inner peripheral portion of the multilayer container, an inclined plane of θ=20° in angle of inclination was provided, and a notch of 60 μm in depth was formed at a position of t=2 mm. At the rib portion, two incisions of 7 mm in length each extending from the lower end of the rib to the flange level were made with the space of 10 mm, then, after the cut piece between the incisions were lifted to make a flat surface, the flat surface was cut away. To the multilayer container, a lid member having a tongue portion and the same layer structure of the lid member (1) used in Example 1 was so heat sealed that the tongue portion would located on the cut-off portion of the multilayer container.

When thus obtained easily-openable packaging container was opened by lifting the tongue piece of the lid member, delamination began from the cut-off portion under the tongue piece, then the inner surface layer was cut at the notch, and the container was opened easily.

What is claimed is:

1. A multilayer container comprising a multilayer structure shaped to define a container portion having an opening and a flange portion surrounding the opening, said flange portion including a planar portion arranged adjacent to said opening for producing an easily openable packaging container by heat sealing a lid member to said multilayer container on said flange portion, which multilayer structure comprises at least a peelable surface layer and a layer contacting the peelable surface layer, one of said peelable surface layer and said layer contacting the peelable surface layer being (A) a resin mixture layer comprising a polypropylene base resin and a polyethylene base resin, wherein the weight ratio between the polypropylene base resin and the polyethylene base resin in the resin mixture layer ranges from 50:50 to 97:3, the other being (B) a polyethylene layer, and the interlaminar strength between the said two layers being adjusted to not more than 1.5 kg/15 mm so that the opening of said packaging container begins with delamination between the said two layers.

2. A multilayer container according to claim 1, wherein said polyethylene layer (B) is a high density polyethylene.

3. A multilayer container according to claim 1, wherein said peelable surface layer is the polyethylene layer (B) and said layer contacting the peelable surface layer is the resin mixture layer (A).

* * * * *